3,532,577
TIRE BUILDING MACHINE FOR BUILDING BELTED TIRES

Walter Niclas, Altwarmbuchen, Hannover, Hans Menell, Ahlem, Hannover, and Günter Johannes, Hannover, Germany, assignors to Continental Gummi-Werke Aktiengesellschaft, Hannover, Germany
Filed Oct. 1, 1965, Ser. No. 492,071
Claims priority, application Germany, Oct. 3, 1964, C 34,022
Int. Cl. B29h 17/14, 17/26, 17/37
U.S. Cl. 156—394                                                          4 Claims

ABSTRACT OF THE DISCLOSURE

Coaxially spaced drums for building up and shaping a tire carcass and further for building up a tire belt are journalled in locations separated from each other and interrelated only above the locations by track means on which a transfer ring means is movable into position surrounding each of the drums for building up purposes. Access space between the location and at a level below the drums is kept entirely open for free access by operating personnel unhindered by any floor surface obstacles such as machine frame structure between the drums.

---

The present invention relates to a machine for building belted tires, which comprises a first drum for building up and shaping the carcass and also comprises a second drum substantially coaxial with said first drum for building up the belt. The machine additionally comprises an axially movable transfer ring for transferring the built-up belt for the second drum to the first drum. More specifically, the present invention concerns tire building machines of the above-mentioned general type in which the drums are arranged at the free end of a shaft journalled in a support.

With machines for building up belted tires, especially those intended for building up small tires, it is known to journal the said two drums on a shaft which is unilaterally journalled in a support. While such an arrangement yields certain advantages, it has the drawback that it is not possible simultaneously to work on both drums. Furthermore, with a machine of this type, it is necessary that the shaft for supporting both drums has to be made very strong, especially when the machine is to be employed for building giant tires.

A machine of the above-mentioned type becomes rather complicated when a plurality of control conduits is required for both drums, which conduits, for structural reasons, must extend from the support for the shaft through the hollow machine shaft to the two drums. This also applies in particular when employing belted tire building drums which are designed as segmental drums and comprise groups of individually operable segments. In this connection it is also to be noted that the working operations for building up and shaping the carcass on one hand and for building up the belt on the other hand cannot be adapted to each other with respect to time in such a way that both drums can be exploiited economically.

It is, therefore, an object of the present invention to provide a machine for building up belted tires, which will overcome the above-mentioned drawbacks.

It is another object of this invention to provide a belted tire building machine with a first drum for building up and shaping the carcass and with a second drum for building up the belt, which will make it possible to work on both drunms simultaneously.

It is a further object of this invention to provide a belted tire building drum as set forth in the preceding paragraphs, which will permit to associate two belted tire building drums with one carcass building drum.

Still another object of this invention consists in the provision of a machine as set forth in the preceding paragraph, in which a transfer ring is so arranged as to be able selectively to pick up the belt from one or the other of the belt building drums and to convey the same to the carcass building drum.

Figure 1:
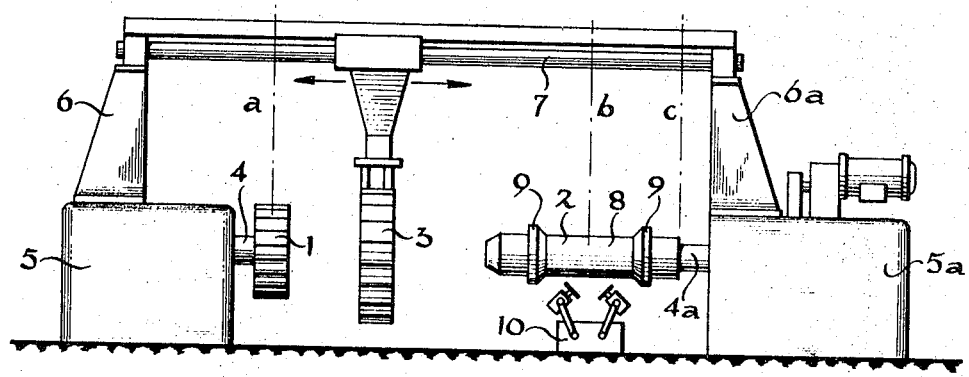

These and other objects and advantages of the invention will appear more clearly from the following specification in connection with the accompanying drawing, in which:

FIG. 1 diagrammatically illustrates a side view of a belted tire building machine according to the present invention.

Figure 2:
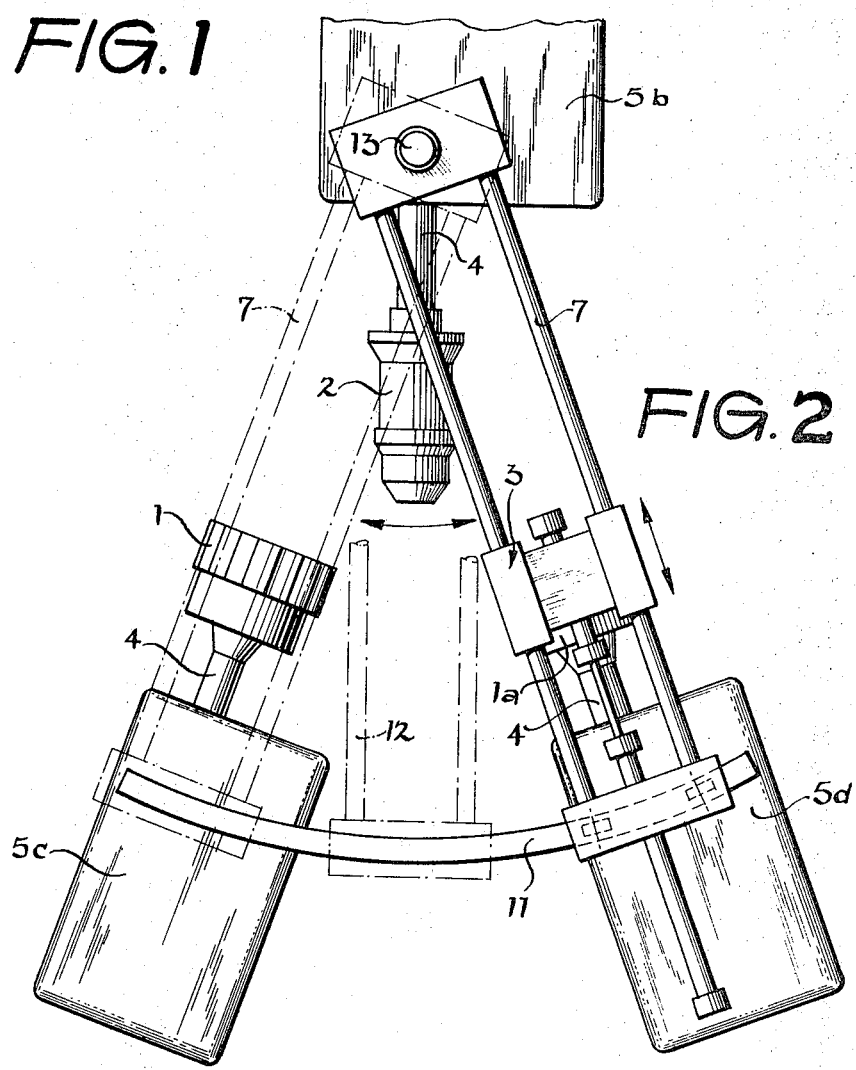

FIG. 2 is a top view of a belted tire building machine which is slightly modified over that shown in FIG. 1 in that it comprises two belt building drums instead of one.

A belted tire building machine according to the present invention, which comprises a first drum for building up and shaping a carcass and a second drum substantially coaxial to said first drum for building a belt while an axially movable transfer ring is provided for transferring the built up belt from the second drum to the first drum, is characterized primarily in that each drum is supported by a separate shaft respectively arranged on separate supports, while the free ends of said shafts face each other and the respective adjacent drum ends are axially spaced from each other, said transfer ring being mounted on a track above said shafts.

Referring more specifically to the drawing, the belted tire building machine illustrated therein comprises a first drum 2 for building up and shaping the carcass of a tire, and also comprises a second or belt building drum 1. The machine is furthermore equipped with a transfer ring 3 which is variable in diameter in a manner known per se and which is adapted selectively to be moved from one drum to the other and vice versa.

The two drums 1 and 2 are substantially coaxially arranged with regard to each other and are supported by the free ends of shafts 4, 4a respectively journalled in supports 5 and 5a. Mounted on said supports, 5, 5a are brackets 6, 6a which support guiding means or a track 7 for the transfer ring 3.

Drum 1 which is composed of segments and is variable in diameter serves in a manner known per se for superimposing and journalling the belt layers. Preferably, also the raw tread stirp surrounding the belt layers is built up on drum 1.

Drum 2 which serves for building up and shaping the carcass is equipped with an inflatable body 8 which is journalled between two end discs 9 for receiving the carcass beads. After a substantially hollow cylindrical carcass body in non-vulcanized condition has been placed on drum 2, the expanding or shaping of said body can be effected by subjecting the inflatable body 8 to the pressure of a pressure fluid and by reducing the distance between the end discs 9.

After the tire belt has been built-up and after the tread strip has been placed thereon, the transfer ring 3 is moved coaxially over drum 1 and by reducing the diameter of said ring 3 the belt with tread strip is grasped. After the diameter of drum 1 has been reduced, transfer ring 3 with the parts grasped thereby is coaxially moved over drum 2. The next step consists in the expanding or shaping of the carcass and connecting the carcass with the belt and the tread strip in such a way that the outer surface of the carcass body will engage the inner surface of the belt. By increasing the diameter of the transfer ring 3, the latter releases the belt with tread strip and subsequently is moved in the direction toward support 5a of drum 2.

The rest or end positions of transfer ring 3 are indicated by dot-dash lines a, b and c. The expanded or shaped tire may now be subjected to further working operations, and to this end a rolling device 10 is provided within the range of drum 2.

Referring now to the embodiment of FIG. 2, the arrangement shown therein comprises a drum 2 with support 5b and two supports 5c and 5d with a belt building drum 1, 1a. The arrangement of FIG. 2 also comprises a transfer ring 3 which is movable on a track 7 arranged above shaft 4 pertaining to drum 2. That end of track 7 which is adjacent drum 2 is pivotable about a vertical shaft 13 so that the oppositely located end of said track which is journalled on arched guiding means 11 can selectively be moved once over belt building drum 1 and once over belt building drum 1a and vice versa so that the belt with the tread strip thereon may selectively be withdrawn from drum 1 and drum 1a. After the belt has thus been withdrawn, track 7 is moved into the position illustrated by dash lines 12 so that the transfer ring 3 will be arranged coaxially with regard to drum 2 and can coaxially with said drum to moved into the positions b, c.

In connection with the machine according to the present invention it is important that the supports 5, 5a, 5b, 5c, 5d also serve for supporting track 7. Track 7 thus extends in the manner of a beam from one support to the opposite support.

The space between drums 1 and 2 is so selected that there will be obtained a free movability for the operator of each drum. Furthermore, the said distance is so selected that the finished raw tire can be withdrawn from drum 2 and by a transverse movement can be moved toward the side.

It is also important that the transfer ring 3 is suspended on track 7 above shaft 4. This arrangement furnishes particularly favorable possibilities for mounting auxiliary devices, such as the above mentioned roller 1. Moreover, the floor area between the two drums 1 and 2 can be plane and will not impede the movements of the operator.

It is, of course, to be understood that the present invention is, by no mean, limited to the particular arrangements shown in the drawing but also comprises any modifications within the scope of the appended claims.

What we claim is:

1. A machine for building up belted tires, which includes: a first drum for building up and shaping a tire carcass body, at least two additional drums for building up a tire belt, all of said drums having their longitudinal axes arranged in substantially the same horizontal plane while said additional drums have their end faces spaced from said first drum, track means arranged in vertically spaced relationship to said plane and above the same, said track means being movable from a position above one of said additional drums to a position above another one of said additional drums and vice versa, and transfer ring means movably suspended on said track means and movable selectively from a position in which it surrounds one of said additional drums to a position in which it surrounds said first drum and vice veersa, said ring means including means operable to pick up a bilt-up belt from one of said additional drums and to move it around and release it onto a built-up carcass body on said first drum.

2. A machine according to claim 1, which includes supporting means and a shaft supporting said first drum and being supported in cantilever fashion by said supporting means, and substantially vertical pivot means pivotally supporting said track means for permitting pivoting the same from above one of said additional drums to above another one of said additional drums and vice versa.

3. A machine for building up belted tires, which includes: a first drum for building up and shaping a tire carcass body, at least two additional drums for building up a tire belt, all of said drums having their longitudinal axes arranged in substantially the same horizontal plane while said additional drums have their end faces spaced from said first drum, the longitudinal axes of said additional drums forming an acute angle with the axis of said first drum and intersecting each other on the longitudinal axis of said first drum, track means arranged in vertically spaced relationship to said plane and above the same, said track means being movable from a position above one of said additional drums to a position above another one of said additional drums and vice versa, and transfer ring means movably suspended on said track means and movable selectively from a position in which it surrounds one of said additional drums to a position in which it surrounds said first drum and vice versa, said ring means including means operable to pick-up a built-up belt from one of said additional drums and to move it around and release it onto a built-up carcass body on said first drum.

4. A machine for building up belted tires, which includes: first supporting means, a first shaft supported by said first supporting means in cantilever fashion, a first drum supported by said first shaft for building up and shaping a tire carcass body, additional supporting means arranged in horizontally spaced relationship to each other and to said first supporting means, additional shafts respectively supported by said additional supporting means in cantilever fashion, additional drums respectively supported by said additional shafts for building up tire belts, all of said drums having their longitudinal axes arranged in substantially the same horizontal plane while having their adjacent end faces spaced from each other, the longitudinal axes of said additional drums forming acute angles with the longitudinal axis of said first drum, substantially vertical pivot means having its pivot axis intersecting the longitudinal axis of said first drum, arched guiding means supported by said additional supporting means and being equi-distantly spaced along its path from said pivot axis, track means arranged in vertically spaced relationship to said plane and above the same and having one end portion pivotally connected to said pivot means for pivoting about the axis thereof, the other end of said track means being guided on said guiding means, and transfer ring means movably suspended on said track means and movable selectively from a position in which it surrounds one of said additional drums to a position in which it surrounds said first drum and vice versa, said ring means including means operable to pick up a built-up belt from one of said additional drums and to move it around and release it onto a built-up carcass body on said first drum.

References Cited

UNITED STATES PATENTS

| | | | |
|---|---|---|---|
| 1,619,019 | 3/1927 | Gammeter | 156—394 X |
| 1,643,202 | 9/1927 | Denmire | 156—394 |
| 2,517,889 | 8/1950 | Kuffler | 156—394 X |
| 2,565,071 | 8/1951 | Frazier | 156—401 X |
| 2,871,912 | 2/1959 | Kraft | 156—394 X |
| 2,878,857 | 3/1959 | Smith et al. | 156—394 |
| 3,070,478 | 12/1962 | Riddle | 156—394 X |
| 3,374,138 | 3/1968 | Porter et al. | 156—416 X |

JOHN T. GOOLKASIAN, Primary Examiner

C. B. COSBY, Assistant Examiner

U.S. Cl. X.R.

156—396, 402, 416